(12) United States Patent
Matthews

(10) Patent No.: US 8,756,166 B2
(45) Date of Patent: Jun. 17, 2014

(54) SYSTEM AND METHOD FOR STORAGE CONTAINER TRACKING AND DELIVERY

(71) Applicant: Boxbee, Inc., San Francisco, CA (US)

(72) Inventor: Kristopher D. Matthews, San Francisco, CA (US)

(73) Assignee: Boxbee, Inc., San Francisco, CA (US)

( * ) Notice: Subject to any disclaimer, the term of this patent is extended or adjusted under 35 U.S.C. 154(b) by 0 days.

(21) Appl. No.: 14/010,175

(22) Filed: Aug. 26, 2013

(65) Prior Publication Data
US 2014/0012773 A1    Jan. 9, 2014

(51) Int. Cl.
*G06Q 30/00* (2012.01)
(52) U.S. Cl.
USPC .......................................................... 705/333
(58) Field of Classification Search
USPC ........................................................... 705/333
See application file for complete search history.

(56) References Cited

U.S. PATENT DOCUMENTS

| 5,880,443 A * | 3/1999 | McDonald et al. ............ 235/375 |
| 2007/0174130 A1* | 7/2007 | Seeley ............................. 705/26 |
| 2011/0218933 A1* | 9/2011 | Hunsaker et al. .............. 705/338 |

* cited by examiner

*Primary Examiner* — Allen J Jung
(74) *Attorney, Agent, or Firm* — Jeffrey Schox; Diana Lin

(57) ABSTRACT

A method for item storage and distribution to a user, each stored item associated with a storage identifier, the user associated with a user identifier, the method including associating a set of storage identifiers with the user identifier, in response to receiving a description for a first storage identifier from a user device associated with the user identifier, storing the description as an storage description for the first storage identifier, setting a fill status of the first storage identifier to packed, and removing storage identifiers having an empty fill status from the set of storage identifiers associated with the user identifier.

21 Claims, 8 Drawing Sheets

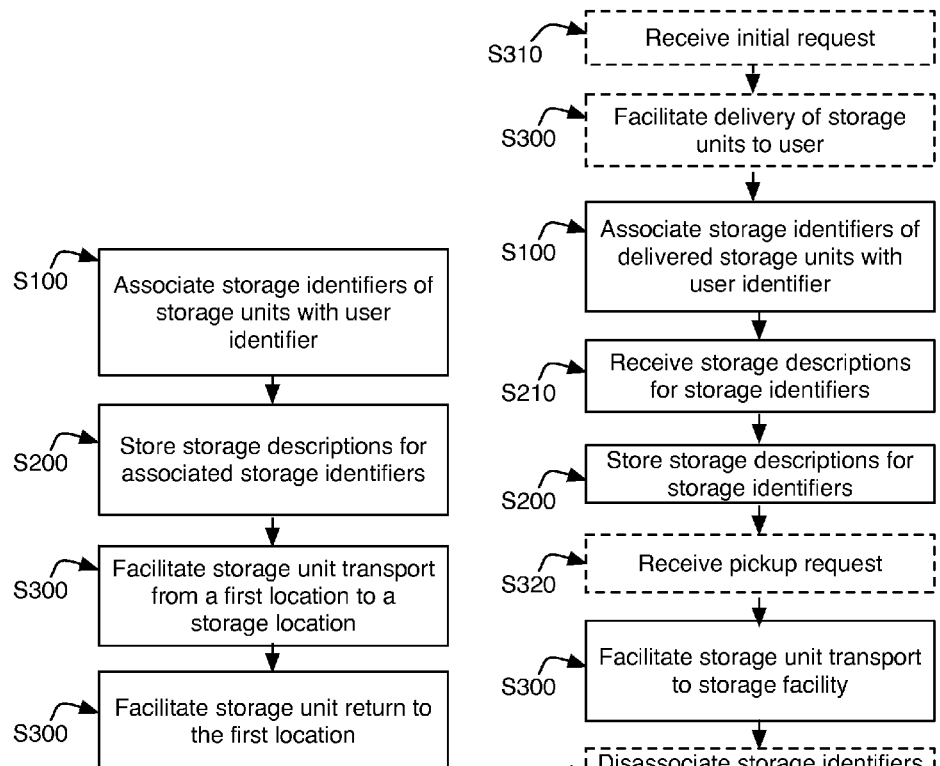
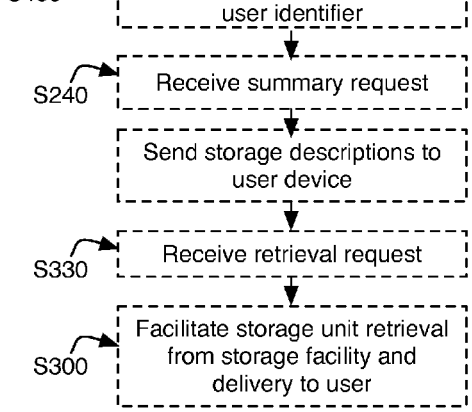
FIGURE 1
FIGURE 2

S210

| Kitchen Stuff | Box ID# 789-203 | Stored Schedule delivery |
|---|---|---|
| [image: pot and pan] | Slow cooker, pot, grill, purple glasses | |

230          230

| Basketball Stuff | Box ID# 123-456 | Options ▽ |
|---|---|---|
| [image: balls] | Balls, jerseys | Deliver Today<br>Deliver 8/12/2013<br>Schedule Delivery |

| Box 1 (edit name) | Box ID# 123-009 | Delivered Schedule pickup |
|---|---|---|
| upload photo or video | Enter contents, separated by commas | |

FIGURE 8

Schedule Retrieval for Selected Boxes
Enter Time          Enter Date              Schedule Delivery ☐ Retrieve All

Kitchen Stuff                           ☒ Retrieve

Slow cooker, pot, grill, purple glasses 230                                                                 230

Basketball Stuff                        ☒ Retrieve

Balls, jerseys

Tools and Drill                         ☐ Retrieve

Drill press, screws, nails, upload photo or video

FIGURE 9

SYSTEM AND METHOD FOR STORAGE CONTAINER TRACKING AND DELIVERY

TECHNICAL FIELD

This invention relates generally to the physical storage field, and more specifically to a new and useful system and method for storage container tracking and delivery in the physical storage field.

BACKGROUND

Conventional storage systems suffer from several drawbacks. In particular, conventional storage systems, such as the PODS storage system, require a user to rent relatively large storage containers. While these containers can be suitable for bulk storage, these containers are typically too large for seasonal or situational storage, wherein small quantities of items need to be stored. Examples of seasonal or situational storage can include winter clothes, snow gear, sports gear, camera gear, and art supplies. This leads to storage inefficiencies for the user, wherein the user is paying for extra (i.e., unutilized) storage space. Furthermore, the relatively large size of the containers precludes the user from dynamically adjusting the amount of storage space that is rented, based on the volume of items that the user desires to store. Additionally, since a user is typically associated with only one storage unit, and rents a larger container when more volume is needed, conventional storage methods only permit users to identify their storage unit according to the storage unit number or the user identifier within the system, and does not allow the user to identify the storage unit according to the storage unit contents.

Conventional storage methods can additionally be inefficient for storage systems. First, the unused space in the storage container is wasted space that can be rented to another user, thereby increasing the storage system user base and potentially increasing profits. Second, the relatively large containers require specialized equipment for movement and transport, such as specialized lifts and trucks.

Thus, there is a need in the physical storage field to create a new and useful method and system of storing and tracking physical items.

BRIEF DESCRIPTION OF THE FIGURES

FIG. 1 is a flow diagram of the storage method.

FIG. 2 is a flow diagram of a variation of the storage method, with optional elements outlined in broken lines.

FIG. 8 is an example of displaying an entry field for storage description receipt and displaying storage descriptions associated with stored storage unit for scheduling a retrieval request.

FIG. 9 is an example of displaying the storage descriptions of the storage identifiers associated with the user identifier, wherein each storage description is displayed with an associated selection option.

DESCRIPTION OF THE PREFERRED EMBODIMENTS

The following description of the preferred embodiments of the invention is not intended to limit the invention to these preferred embodiments, but rather to enable any person skilled in the art to make and use this invention.

As shown in FIGS. 1 and 2, a first embodiment of the method includes: facilitating delivery of a container having a storage identifier to a user-requested location at a user-requested time S310; associating the storage identifier with the user identifier in response to receipt of the storage identifier from a delivery device S100; receiving a media description from a user device associated with the user identifier S210; storing the received media description as a storage description for the storage identifier S200; receiving a retrieval request from the user identifier based on the first storage description, the retrieval request including a retrieval location and a retrieval time S330; and facilitating delivery of the first container to the retrieval location at the retrieval time S300. This method provides several benefits over conventional storage services. This method enables a user to identify an individual stored item based on a self-assigned description, wherein the descriptions can be descriptions of the stored item(s), such as the contents of the storage containers. This is differentiated over conventional storage systems, which require the user to remember the container contents of a given storage container. Furthermore, when relatively small storage containers (e.g., storage boxes or bins) are used, this method enables a user to categorize the stored items into discrete containers that are independently tracked, and to retrieve a specific subset of stored items independent of other stored items. Furthermore, when relatively small storage containers (e.g., storage boxes or bins) are used, this method enables a user to dynamically scale the amount of external storage space that is rented.

Figure 6:
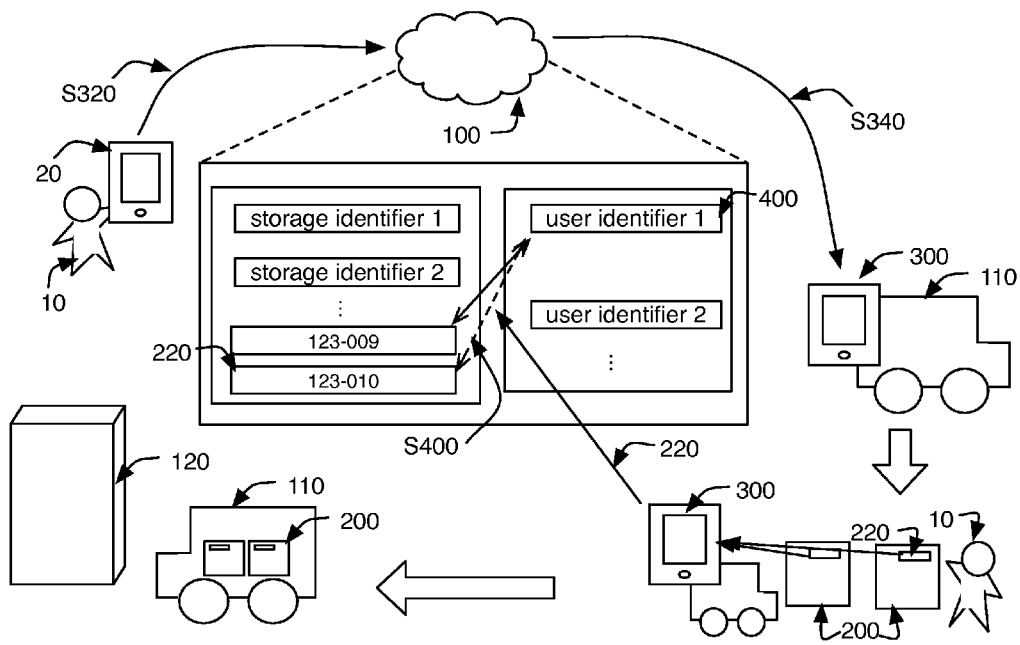
FIG. 6 is a schematic representation of a variation of the system and method wherein unpacked or unused boxes are removed from the set of storage identifiers associated with the user identifier at the point of pickup.

In a second embodiment as shown in FIG. 6, the method includes: associating a set of storage identifiers with the user identifier S100; identifying the storage identifiers to be disassociated from the user identifier; and removing the identified storage identifiers from the set of storage identifiers associated with the user identifier S400. In one example, a set of storage identifiers are associated with the user identifier, a subset of the storage identifiers are marked as empty by a delivery device, and the empty storage identifiers are removed from the set of storage identifiers associated with the user identifier. By enabling storage identifier disassociation by the delivery device or user device, this method enables dynamic adjustment of the number of storage units provided to the user at the point of delivery. For example, if a user initially requests four containers and decides that five containers are really needed, the delivery person can give the user an additional container when the four containers are delivered and enter the storage identifier of the additional container for association with the user identifier. If a user requested more containers than are actually used, containers (e.g., storage identifiers) can be dynamically disassociated from the user identifier (e.g., by the user or delivery person) prior to or at the time of storage unit retrieval. This embodiment of the method can be performed alternatively or additionally with the first embodiment of the method.

1. System.

The method is performed by a storage system 100 that digitally coordinates the storage unit transport, storage, and identification. The storage system includes one or more networked servers. The servers can be stateless, stateful, or have any other suitable configuration or property. The storage system can additionally include a native application, a web browser, or any other suitable user interface remotely connected to the server and configured to execute on a computing device. The storage system can alternatively be a peer-to-peer system. The storage system preferably coordinates storage unit retrieval and delivery between one or more delivery locations and one or more storage facilities. The storage system 100 can additionally include the delivery vehicles 110, the vehicle delivery persons, and/or the storage facilities 120.

The storage unit 200 is a unit that is tracked, stored, and transported by the system 100. The storage unit 200 is preferably a container 210, more preferably a container provided by the storage system but alternatively a container provided by the user or a third party. The storage unit 200 can alternatively be a stored item that is not encapsulated, such as a snowboard or couch. As an example, a storage identifier can be affixed to the item itself (e.g., via adhesive, a band, tag, etc.). The container 210 is preferably a storage box or bin, but can alternatively be a bankers box or any other suitable storage container. In one specific variation, the container is between 24" and 20" long, 19" to 16" wide, and 12" tall. However, the container can have any other suitable configuration.

The storage unit 200 is identified by a storage identifier 220 that uniquely identifies the storage unit within the storage system. The storage identifier 220 is preferably provided by the storage system 100, but can alternatively be provided by the user or by a third party. The storage identifier 220 and any associated data is preferably stored by the one or more servers, but can alternatively be stored on the user device(s) or delivery device(s) associated with user identifiers having access to the storage identifier information. The storage identifier 220 can be physically attached to the storage unit, but can alternatively be associated through a tag 211 representative of the storage identifier that is physically attached to the storage unit. The storage identifier or tag can be printed, stamped, molded, adhered, hung, or otherwise attached to the storage unit or item. The storage identifier 220 is preferably an alphanumeric code that uniquely identifies the storage unit within the system, but can alternatively be a signature pattern, such as a barcode, QR code, container fingerprint (e.g., scratches, scuff marks, discolorations, etc.), the combination of container contents, or any other suitable unique identifier. The storage identifier 220 can be pseudo-randomly generated, generated using an equation, or otherwise generated. The tag can be the storage identifier, a signature pattern that corresponds to the storage identifier, a wireless transmitter (e.g., an RFID tag), or any other suitable tag that can be externally detected. In one variation, the storage identifier can be an alphanumeric code, wherein a signature pattern on the storage unit (e.g., barcode, QR code, etc.) corresponds to the storage identifier though a lookup table, equation, or other association means. The storage identifier 220 is preferably identified from the signature pattern by the user device, more preferably by the native application or browser application running on the user device, but can alternatively be identified by the server, wherein the signature pattern is sent to the server. The server can additionally send the storage identifier back to the user device.

The storage identifier 220 can additionally be associated with or include a fill status or association status, which functions to determine whether a container is used and/or should be associated with a user identifier. Container association with a user identifier can be useful for invoicing. A storage identifier can be associated with a packed fill status when the container lumen is deemed to contain contents (e.g., by a user, delivery person, storage facility worker, imaging system, etc.) or an empty fill status when the container lumen is deemed to not include physical contents.

The storage identifier 220 can additionally be associated with a storage status. The storage status can be set as delivered when the storage unit has been delivered to a user-specified location. The storage status can be set as stored when the storage unit has been delivered to a storage facility. The storage status can be set as in transit when the storage unit has been retrieved from a storage facility and has not yet been delivered to the user-specified location, or when the storage unit has been retrieved from a user-specified location and has not yet been delivered to a storage facility. However, any other suitable storage status can be stored for the storage identifier. The storage status is preferably reset upon receipt of data indicative of the storage identifier from a delivery device, but can alternatively be reset upon receipt of data indicative of the storage identifier from a user device. The new storage status can be determined based upon the previous storage status for the storage identifier, the location data from the delivery device, the time data from the delivery device, or based upon any other suitable information.

The storage identifier 220 can additionally be associated with a storage unit history. The storage unit history can include the owner user identifier, the user identifiers of the users to whom the container has been delivered, the delivery times, delivery locations, storage facilities, environmental parameters of the delivery locations and/or storage facilities, or any other suitable parameter.

The storage identifier 220 can additionally be associated with container parameters. The container parameters can include the container age, type, dimensions, material, or any other suitable parameter.

The storage identifier 220 can additionally be associated with a storage description 230, which functions to provide a description in addition to the storage identifier that allows the user to identify the storage unit. The storage description 230 preferably includes a media description, but can alternatively include any other suitable description. The media description can be text (e.g., a list), one or more images (e.g., digital photograph), one or more videos, one or more audio clips, or any other suitable media. The storage description 230 is preferably received from a user device associated with the user identifier, wherein the user identifier is associated with the storage identifier. However, the storage description 230 can be automatically generated, received from the storage facility (e.g., be a scan or photograph of the container taken by the storage facility), or otherwise received. The storage description 230 is preferably generated at a device (e.g., received at the device), but can alternatively be uploaded from digital storage, downloaded from an external server, or otherwise obtained.

The storage facility 120 with which the method is used functions to store the storage units. The storage facility 120 includes a physical storage space. One or more storage facilities can be used with the method, wherein the method and system further function to track the storage facility in which each storage unit is stored. The storage facility 120 can be a warehouse (wholly or partially rented or owned by the storage system), privately owned spaces (e.g., homes, basements, etc.), a location of a second user of the system, or any other suitable physical space. When privately owned spaces are used, the system and method can additionally facilitate selecting a privately owned space from a plurality of privately owned spaces, delivering the storage unit to the selected privately owned space, and/or coordinating payment between the storage item owner and the space owner (e.g., in a crowd-sourced or space sharing service). Each storage facility preferably includes a facility device, which can be used to receive and/or retrieve storage units stored within the facility. The facility device is preferably a portable, networked device, such as a smart phone, tablet, or laptop. The facility device can include the native application of the system. Conventional warehouse inventory tracking systems and methods are preferably used to track containers within the facility, but any other suitable systems and methods can alternatively be used.

The delivery device 300 functions to verify storage unit pickup and drop-off. The delivery device 300 can additionally function to track the storage unit and/or delivery person location or movement during transport. The delivery device 300 can additionally function to notify the delivery person of a pickup or delivery location, time, number of storage units, and/or storage unit identifiers. The delivery device 300 is preferably a networked portable device remotely connected to the server, and can be a smartphone, tablet, laptop, or any other suitable portable device. The delivery device 300 can include a geolocation mechanism that can be network-based (e.g., radio tower multilateration), handset-based (e.g., GPS), SIM-based, a hybrid, Wifi, or based on any other suitable geolocation technology. The delivery device 300 can include a motion detection mechanism, such as an accelerometer, a gyroscope, or any other suitable motion detection mechanism. The delivery device 300 can include a media recording mechanism, such as an imaging system (e.g., a camera), a microphone, speakers, light emitting mechanism, or any other suitable data recording mechanism. The delivery device 300 is preferably on-board the delivery vehicle, but can alternatively be the portable device (e.g., smartphone) of the delivery person. The delivery person can be an in-house delivery person, or be a delivery person of a third-party vehicle service (e.g., taxi service, Uber™, Sidecar™, Lyft™, etc.). The delivery device 300 can be associated with a delivery identifier that functions to identify the delivery person or delivery vehicle.

The user 10 of the method functions to rent storage space for stored items (e.g., possessions) in a remote storage location using the method and system. The user 10 preferably additionally functions to provide a storage description 230 for each storage unit 200. The user 10 can additionally request storage unit retrieval and delivery. The user 10 can additionally function to receive and pack the stored items within the container. The user 10 is preferably associated with a user identifier 400, which is used to identify the user within the system. The user identifier 400 is preferably an identifier of the storage system, and can be an alphanumeric code, a signature pattern, or any other suitable unique user identifier. Alternatively, the user identifier 400 can be a user identifier from a third-party social networking service (e.g., Facebook, Twitter, Linkedin, etc.), such as a username, an email address, or any other suitable user identifier. The user identifier 400 is preferably associated with a set of storage identifiers, wherein the set of storage identifiers preferably identifies the set of storage units stored by the user. However, the set of storage identifiers can alternatively identify the set of storage units assigned to the user (e.g., rented by the user), owned by the user, or identify any other suitable category of storage units. The user identifier 400 can additionally be associated with a user profile. The user profile can include a history of the storage identifiers currently and/or previously associated with the user identifier, user preferences (e.g., preferred payment method, delivery and/or pickup times, delivery and/or pickup locations, etc.), or any other suitable user information.

The user 10 can be associated with one or more user devices 20. The user device 20 is preferably a networked portable device remotely connected to the server, and can be a smartphone, tablet, laptop, or any other suitable portable device. The user device 20 is preferably connected to the server, wherein the connection is preferably a wireless connection, such as WiFi, a cellular network service, or any other suitable wireless connection, a near field connection, such as radiofrequency, Bluetooth, or any other suitable near field communication connection, or a wired connection, such as a LAN line. The user device 20 can additionally or alternatively function as the server, such as in a distributed network system. The user device 20 can additionally include a geolocation mechanism, motion detection mechanism, media recording mechanism, or any other suitable feature. The user device 20 is preferably associated with the user identifier through a login. The user device 20 preferably runs the native application, web browser, or any other suitable user interface.

The system 100 is preferably responsive to received requests. The received requests are preferably received from a user device 20 associated with a user identifier 400. As multiple devices can be associated with a single user identifier, the user device from which requests is received can differ between requests. A request preferably includes a location, and can additionally include a time. The location and time are preferably user-specified and received from the user device, but can alternatively be automatically determined (e.g., from historical requests, user preferences, current or anticipated user location based on a location of preferred user device, etc.) or otherwise determined. The location is preferably a physical, geographical location, and can be identified by an address, coordinates (e.g., latitude, longitude), a predetermined label (e.g., a tag that maps to an address), a pre-defined area (e.g., geofenced area), or any other suitable means. The time is preferably a timestamp (e.g., date, hour, and minute), but can alternatively be a time duration (e.g., 30 minutes from the present time), a time range (e.g., between 3 pm and 5 pm), or any other suitable time measurement. The request location and time can be determined from historical delivery and pickup locations or times associated with the user identifier, from currently selected locations and times for another storage identifier within the set of associated storage identifiers, received from the user, or determined in any other suitable manner.

The request can include an initial request 510, which functions to notify the system that a storage unit should be delivered to the user. The initial request 510 can be a container request (e.g., a request for containers), can be a tag request, or can be any other suitable storage unit request. The initial request 510 is preferably received from a user device associated with the user identifier. The initial request 510 can include a number of containers or tags to be delivered. The initial request 510 can additionally include the size, type, or specify any other suitable storage unit parameter. The initial request 510 can additionally include a delivery time and a delivery location, wherein the initial request information is sent to a delivery device, and container delivery to the delivery location at the delivery time is facilitated by the system. Alternatively, the storage identifiers 220 can be sent (e.g., emailed, mailed, or otherwise transported) to the user 10 or user device 20.

The request can include a pickup request 520, which functions to notify the system that a storage unit should be retrieved from the user. The pickup request 520 is preferably received from a user device associated with the user identifier. The pickup request 520 can include a number of storage units to be retrieved and delivered to a storage facility. Alternatively, the pickup request 520 can include the set of storage identifiers of the storage units to be retrieved. The pickup request 520 can additionally include a pickup time and a pickup location. The pickup request information is sent to a delivery device, and container pickup from the pickup location at the pickup time is facilitated by the system. The system 100 preferably automatically selects the storage facility 120 to which the storage units 200 are to be delivered, but the storage facility identifier can alternatively be received from the user device 20 (e.g., based on a storage facility selection).

The request can include a summary request 530, which functions to retrieve the storage descriptions of the storage identifiers associated with the user identifier. The summary request 530 is preferably received from a user device associated with the user identifier, but can alternatively be received from a user device associated with a second user identifier. The storage descriptions 230 of the storage identifiers 220 are preferably sent to and displayed at the user device 20. The storage identifiers 220 can additionally be sent to and displayed at the user device 20. The storage status of the storage identifier 220 can additionally be sent to and displayed at the user device 20.

The request can include a retrieval request 540, which functions to notify the system that a storage unit 200 should be delivered to the user. The storage unit 200 is preferably a storage unit 200 stored in a storage facility 120, but can alternatively be a storage unit 220 located remote from the storage facility 120. The retrieval request 540 is preferably received from a user device 20 associated with the user identifier 400. The retrieval request 540 can include the storage identifier 220 of the storage units 200 to be delivered. Alternatively, the retrieval request 540 can include the storage description 230 of the storage units 200 to be delivered (e.g., a selection indicative of a storage description selection), wherein the system 100 automatically determines the storage identifier 220 based on the storage description 230. The retrieval request c540 an additionally include a retrieval time and a retrieval location, wherein the retrieval request information is sent to a delivery device and container delivery to the retrieval location at the retrieval time is facilitated by the system 100. Alternatively, information for the storage facility 120 at which the storage units 200 are stored can be sent to the user device 20.

2. Method.

As shown in FIG. 1, the method for stored unit distribution to a user includes associating a set of storage identifiers with a user identifier S100, storing a storage description received from the user identifier in association with a storage identifier that is associated with the user identifier S200, and facilitating transport of a storage unit identified by one of the set of storage identifiers between a storage location and a user-specified location S300. The method can additionally include removing storage identifiers from the set of storage identifiers associated with the user identifier S400. The method functions to store and transport possessions of a user. More preferably, the method functions to store, track, and deliver containers containing user possessions. The method can additionally provide containers to users for use.

2.1. Associating a Storage Identifier with a User Identifier.

Associating a set of storage identifiers with a user identifier S100 functions to identify the storage identifiers for which the user will be invoiced. Associating a set of storage identifiers with a user identifier can include assigning a storage identifier to a user identifier, and can additionally include assigning a user identifier to a storage identifier. The set of storage identifiers can include one or more storage identifiers. The set of storage identifiers is preferably associated with the user identifier after receipt of an initial request from a user device associated with the user identifier. Alternatively, the set of storage identifiers can be associated with a second user identifier after receipt of an initial request from a user device associated with a first user identifier, wherein the initial request further includes the second user identifier (e.g., when the first user gifts or reserves storage containers for a second user). The number of storage identifiers associated with the user identifier is preferably equal to the number of tags or containers requested by the user identifier, but can alternatively be more (e.g., in response to an additional storage unit request from the user or user device at the point of delivery) or less (e.g., in response to a storage unit removal request from the user or user device at the point of delivery).

In a first embodiment of the method, the set of storage identifiers is automatically associated with the user identifier by the system. The set of storage identifiers is preferably automatically associated with the user identifier in response to a receipt of an initial request from a user device associated with the user identifier, but can alternatively be associated with the user identifier by the facility device, delivery device, or by any other suitable party. The number of storage identifiers in the set is preferably equal to the number of containers requested within the initial request, but can alternatively be more than the requested number of containers. The containers or tags identified by the associated set of storage identifiers are preferably delivered to the user.

Figure 3:
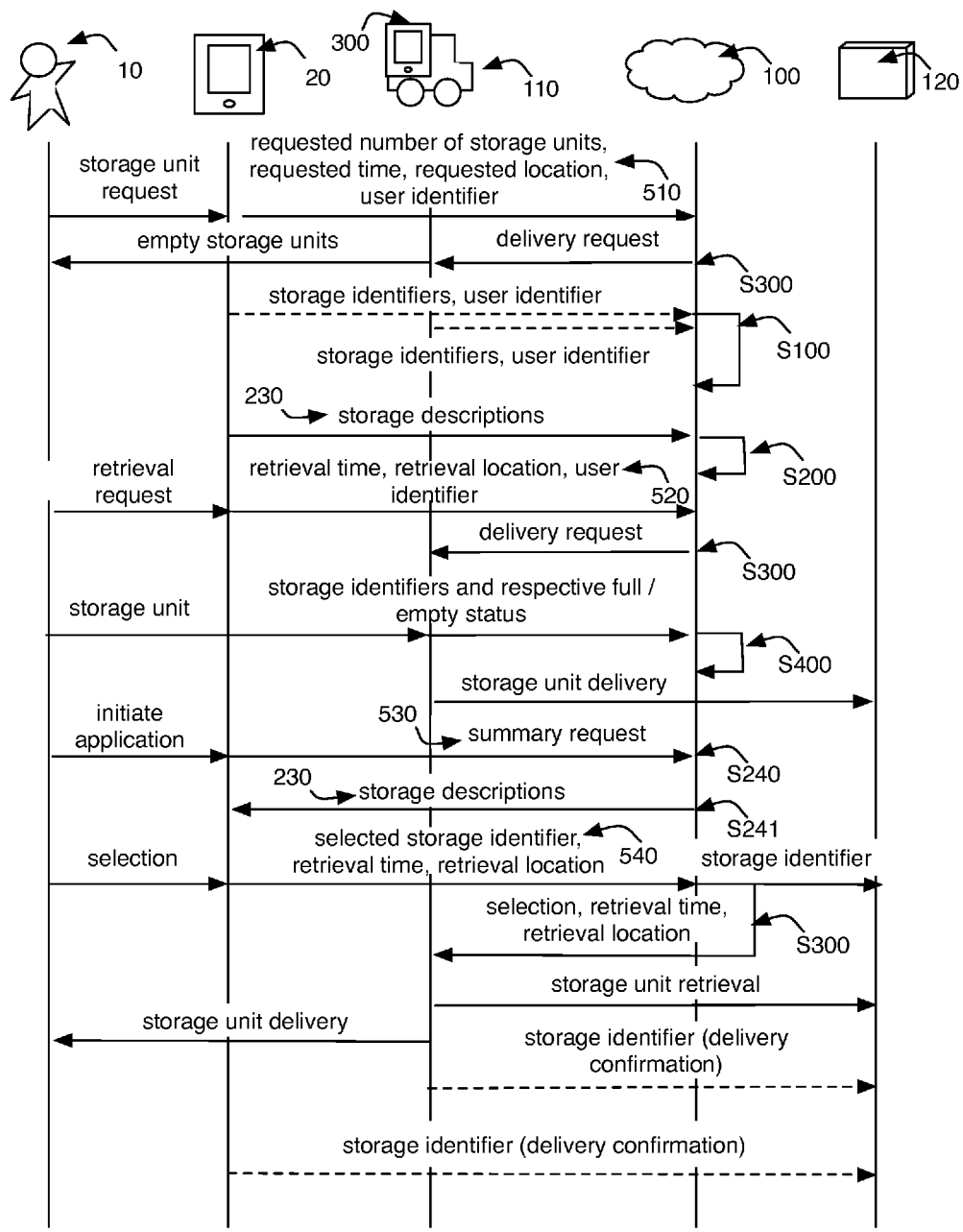
FIG. 3 is a schematic representation of a variation of the storage method.
Figure 4:
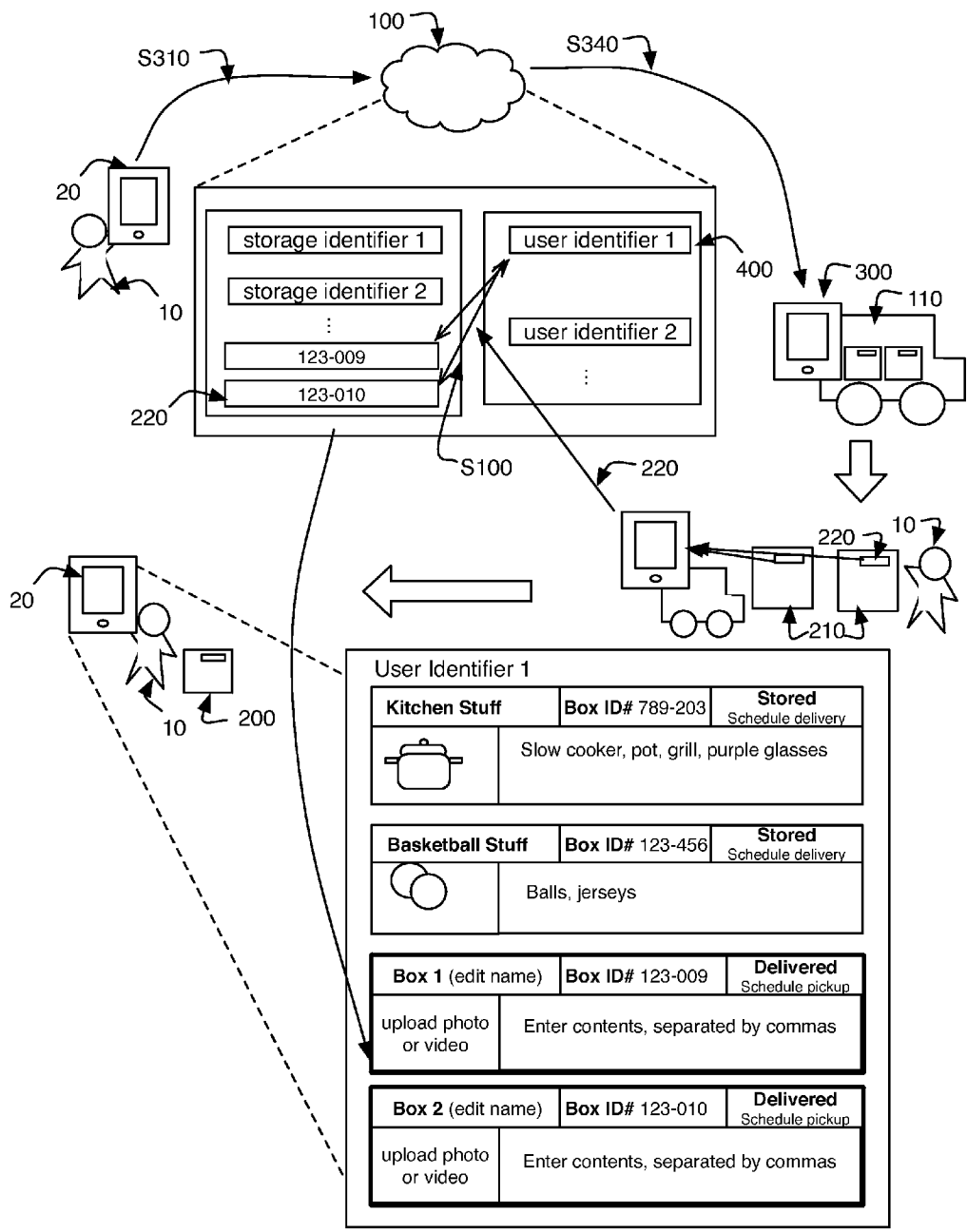
FIG. 4 is a schematic representation of a variation of the system and method wherein delivery of storage units is facilitated in response to receipt of an initial request and storage identifiers are associated with the user identifier at the point of delivery, wherein the user can view the newly associated storage unit information.

In a second embodiment of the method, the set of storage identifiers is associated with the user identifier in response to receipt of the set of storage identifiers from the delivery device, as shown in FIG. 4 and optionally shown in FIG. 3. The storage identifier is preferably entered by the delivery person into the delivery device, but can alternatively be automatically detected by the delivery device. The storage identifier can be entered in a text entry field, scanned by the delivery device, identified by image analysis (e.g., pattern analysis) of an image of the container or storage tag, detected by an RFID receiver, detected by a Bluetooth receiver, or determined in any other suitable manner. The storage identifiers are preferably entered at the point of delivery when the storage units are delivered to the user, but can alternatively be entered prior to delivery of the storage units to the user. In this variation, the user identifier can be entered into the delivery device in association with the storage identifier. In another variation of this embodiment, the user identifier can be automatically determined by the delivery device. For example, the method can include receiving the delivery location and delivery time from the delivery device when the storage identifier is received and determining the user identifier associated with an initial request including a requested time and requested location similar to the delivery time and delivery location within a threshold time range and location range, respectively.

In third embodiment of the method, the set of storage identifiers is associated with the user identifier in response to receipt of the set of storage identifiers from the user device, as optionally shown in FIG. 3. The storage identifier is preferably entered by the user, but can alternatively be automatically detected by the user device. The storage identifier can be entered in a text entry field, scanned by the user device, identified by image analysis (e.g., pattern analysis) of an image of the container or storage tag, detected by an RFID receiver, detected by a Bluetooth receiver, or determined in any other suitable manner. The storage identifiers can be entered in association with the storage descriptions, or can be entered separate from the storage descriptions. For example, the user can be prompted on the user device to enter the storage descriptions to confirm receipt of the storage identifiers or containers. However, the storage identifier can be otherwise associated and recorded in association with the user identifier.

Associating a set of storage identifiers with the user can additionally include associating an additional storage identifier with the user identifier, in excess of the requested number of storage units. Association of an additional storage identifier with the user identifier is preferably in response to receipt of a user request at or before the point of delivery (e.g., before the delivery person is at the delivery location) from the user (e.g., via a verbal request) or the user device. The additional storage identifier is preferably associated with the user identifier when the delivery person gives the extra storage unit to the user. The extra storage unit is preferably an extra storage unit carried on the delivery vehicle (e.g., unassigned to another user identifier), but can alternatively be a storage unit previously assigned to second user identifier, wherein the storage identifier is disassociated from the second user identifier and assigned to the first user identifier. Association of an additional storage unit with the user identifier is preferably used when the storage identifiers are automatically assigned to the users prior to storage unit delivery, but can alternatively be used in any other suitable embodiment of the method. Association of the additional storage identifier with the user identifier is preferably in response to receipt of an additional storage identifier with receipt of the set of storage identifiers assigned to the user identifier by the system. The additional storage identifier can alternatively be associated with the user identifier in response to receipt of the additional storage identifier from the user device. However, the additional storage identifier can be otherwise associated with the user identifier.

2.2. Storing a Storage Description in Association with a Storage Identifier.

Figure 10:
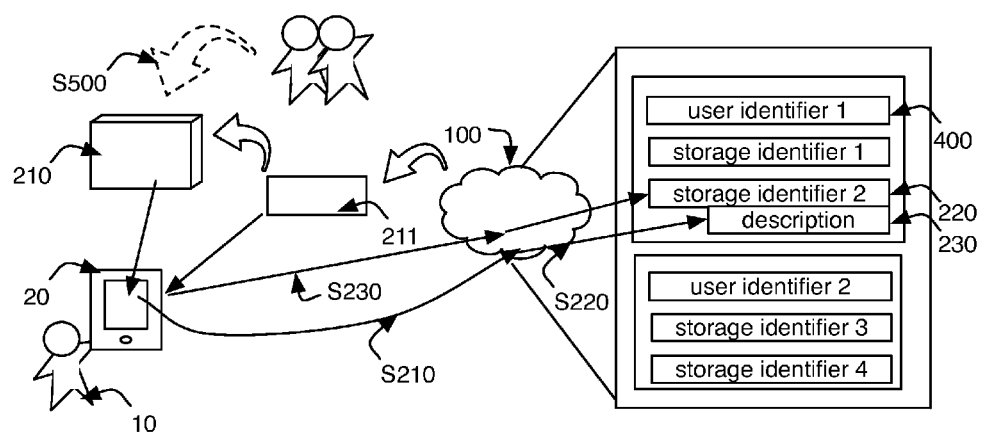
FIG. 10 is schematic representation of a variation of the storage method in which storage units are received from a third party distributor, tags are applied to the storage units, and storage descriptions are stored in response to receipt of a storage description in association with a storage identifier from the device.

Storing a storage description in association with a storage identifier 5200 functions to store a description of a storage item for future user reference. Storing a storage description preferably includes receiving a description for a storage identifier from a user device associated with the user identifier S210 and storing the description as a storage description for the storage identifier S220 (as shown in FIG. 10), wherein the storage identifier is preferably previously associated with the user identifier or can be newly associated with the user identifier in response to receipt of the storage description for the storage identifier. The user identifier and/or storage identifier can additionally be received with the storage description. Each storage identifier is preferably associated with at most one of each type of media description (e.g., one picture, one list, etc.), but can alternatively be associated with multiple storage descriptions. The storage descriptions are preferably from a single user identifier, more preferably from the user that initially stored the stored item, but can alternatively be from multiple user identifiers. The storage description can be a photograph taken by the user device, a text description input into the user device, a video clip recorded by the user device, an audio clip recorded by the user device, a media file downloaded by the user device and uploaded into the system, or any other suitable description.

Figure 5:
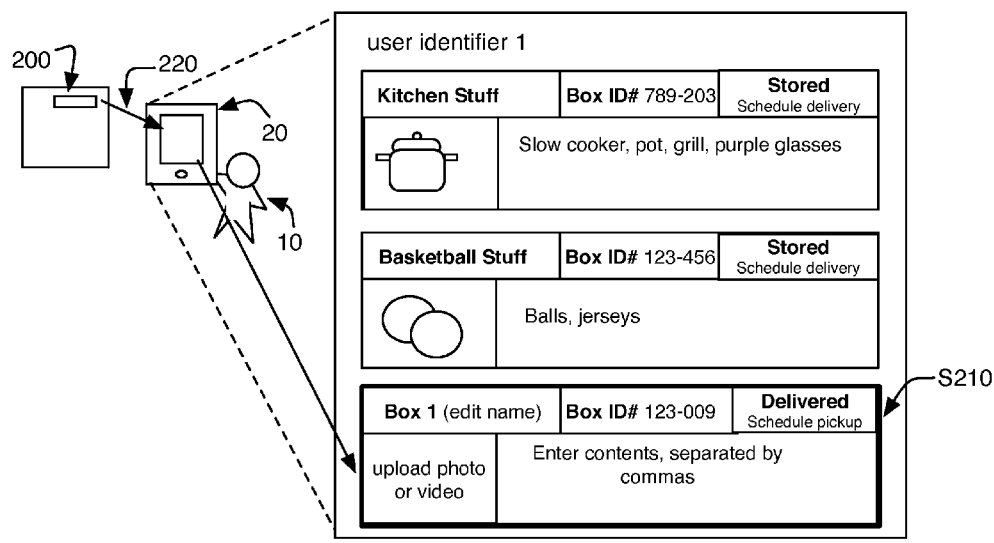
FIG. 5 is a schematic representation of a variation of the system and method wherein the storage description for a storage identifier is received in response to receipt of the storage identifier.

The storage description is preferably received in response to receipt of a storage identifier S230 (as shown in FIGS. 5 and 10), but can alternatively be otherwise received in any other suitable order (e.g., received then associated with a storage identifier). Storage descriptions for multiple storage identifiers can be received in a single session. Alternatively, a storage description can be received each time a storage identifier is received. The storage description is preferably received in response to displaying an entry field at the user device (e.g., by the native application or the web browser), wherein the entry field can be displayed in response to receipt of a storage identifier or in response to any other suitable selection received from the user device. For example, a user can take a picture of an identifier tag. The digital image of the identifier tag can be analyzed by the device to extract a unique pattern, wherein the unique pattern can be mapped to a storage identifier. In response to determining the storage identifier, an entry field can be displayed at the user device, and a storage description received (e.g., as shown in FIG. 8). Examples of displaying the entry field include initiating an image, video, and/or audio capturing device (e.g., initiating camera operation).

Figure 7:
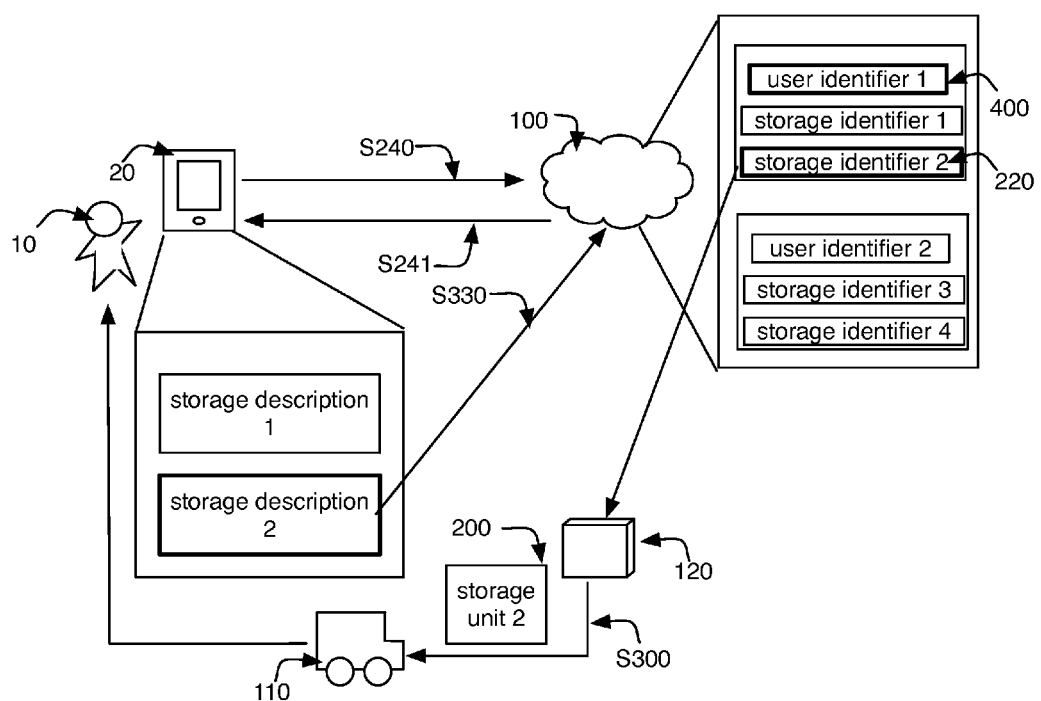
FIG. 7 is a schematic representation of a variation of stored storage unit retrieval.

The storage description is preferably retrieved in response to receipt of a summary request from a user device associated with the user identifier S240 (e.g., as shown in FIG. 2, FIG. 3, and FIG. 7). The user identifier is preferably received with the summary request (e.g., entered by the user or retrieved from device permissions), but can alternatively be received or determined separate from the summary request. The storage descriptions for each the storage identifier is preferably retrieved in response to receipt of a summary request. Alternatively, the storage descriptions for each storage identifier having a stored status can be retrieved in response to receipt of the summary request. The storage description can be retrieved in response to receipt of a summary request from a user device associated with the user identifier (e.g., through a login). The retrieved storage descriptions are preferably sent to the user device from which the summary request was received S241. The retrieved storage descriptions can additionally be displayed on the user device, with or without the respective storage identifiers. Each retrieved storage description can additionally be displayed on the user device with an associated selection option (e.g., a selection box, retrieval request generation option, etc.), as shown in FIG. 9, wherein selection of the selection option generates a retrieval request for the storage unit (e.g., identified by the storage identifier) associated with the storage description. Generation of a retrieval request can additionally include presenting a retrieval location and retrieval time selection to the user. In response to receipt of a retrieval request associated with the user identifier including a selection associated with the storage description, the system can facilitate delivery of the storage unit identified by the storage identifier to the retrieval location at the retrieval time.

The storage description can additionally be retrieved, sent, and/or displayed in response to a query from the user device associated with the user identifier, wherein the storage description is associated with a storage identifier associated with the user identifier. The storage identifier can additionally be retrieved with the storage description. The retrieved storage description preferably includes an element that substantially matches the user query, but can alternatively include an element that is related to the user query (e.g., related through a hierarchical tree of categories, etc.). For example, a storage description including the text "slow cooker" or an image of a slow cooker can be retrieved in response to a user query of "slow cooker." In another example, a storage description including a video of a skier can be retrieved in response to a user query of "snow." However, the storage description can be returned in response to any other suitable action received from the user device associated with the user identifier.

2.3. Facilitating Transport of the Storage Unit.

Facilitating transport of the storage unit S300 functions to retrieve and deliver the identified storage unit to a location. The location can be a requested location, a storage facility, or any other suitable location. The storage unit can include or not include storage items. The same delivery person (associated with a delivery vehicle and a delivery device) preferably delivers and retrieves the storage unit, but different delivery persons can deliver and retrieve the storage unit. Facilitating transport of the storage unit can include selecting a delivery device and sending a delivery request to the delivery device S340. The delivery request can include storage unit information (e.g., storage identifier, number of storage units, etc.), a requested timeframe, and a requested location. Facilitating transport of the storage unit can additionally include receipt of acceptance of the transport task from the delivery device and associating the delivery identifier associated with the delivery device with the user identifier. Facilitating transport of the storage unit can additionally include sending the delivery identifier or information associated with the delivery identifier (e.g., a photograph of the delivery person, the name of the delivery person, the make and model of the delivery vehicle, etc.) to the user device associated with the user identifier. Facilitating transport of the storage unit can additionally include sending payment to the delivery person (e.g., sending payment to the delivery identifier) in response to delivery fulfillment or request satisfaction. Facilitating transport of the storage unit can additionally include notifying the storage unit distribution center or storage facility that the delivery person will retrieve the identified storage unit. Alternatively, facilitating transport of the storage unit can include facilitating user retrieval of the storage unit, wherein the storage unit location information (e.g., storage facility information) can be sent to the user device associated with the user identifier.

Transport of the storage unit can be facilitated in response to receipt of an initial request from a user device associated with the user identifier S310 (as shown in FIG. 4). S310 functions to deliver empty containers or unassociated tags to the user. The initial request preferably includes a number of storage units. The initial request can additionally include a requested time and/or a requested location. At least the requested number of storage units are retrieved from a storage facility by the delivery person and delivered to the requested location at the requested time, within a time threshold from the requested time. Alternatively, if a delivery vehicle has at least the requested number of storage units on-board, the delivery vehicle can directly deliver the storage units to the requested location at the requested time, within a time threshold. The initial request can be satisfied when a set of storage identifiers is received from the delivery device at the requested location, when a set of previously unassociated storage identifiers is received from the user device, when the set of pre-assigned storage identifiers is received from the user device associated with the user identifier or from the delivery device, or satisfied in response to any other suitable condition.

Transport of the storage unit can be facilitated in response to receipt of a pickup request from a user device associated with the user identifier S320 (as shown in FIG. 6). S320 functions to retrieve storage units from the user. The pickup request can be received with the initial request or the retrieval request, or can be received independent of other requests. S320 can additionally function to disassociate unneeded (e.g., empty) containers from the user identifier. The pickup request preferably includes requested time (pickup time) and a requested location (pickup location). The pickup request is preferably satisfied when all or a subset of the set of storage identifiers associated with the user identifier that have a delivered storage status (e.g., the set of identifiers associated with storage units that are in user possession) is received from a delivery device, but can alternatively be satisfied in response to any other suitable event. Alternatively, transport can be facilitated automatically. For example, the storage unit can be retrieved a given time period after delivery (e.g., 10 days after container delivery).

Transport of the storage unit can be facilitated in response to receipt of a retrieval request from a user device associated with the user identifier S330, as shown in FIGS. 2 and 7. S330 functions to deliver stored storage units to the user. The retrieval request is preferably received from a user device after the storage descriptions of the storage identifiers associated with the user identifier are sent to the user device. However, the retrieval request can be received at any other suitable time. The retrieval request preferably includes information associated with a storage identifier that is associated with the user identifier. More specifically, the retrieval request can include the storage identifier, storage description, or a unique pattern that can be mapped to a storage identifier within a database. The retrieval request preferably includes requested time (retrieval time) and a requested location (retrieval location). The retrieval request is preferably satisfied when the storage identifier of the requested storage unit is received from a user device (e.g., wherein the user scans the storage identifier or tag with a user device), but can alternatively be satisfied when the requested storage identifier is received from a delivery device at a delivery time and location substantially similar to the retrieval time and location, or in response to any other suitable event.

Selecting a delivery device functions to select a delivery person for transportation of the storage units. The delivery person can be a person or vehicle employed by the system, or can be a delivery person or vehicle hired through a third-party vehicle system. Conventional methods of delivery vehicle selection based on delivery efficiency optimization (e.g., based on speed to delivery, fuel efficiency, etc.) are preferably used to select the delivery device. While available delivery devices (e.g., delivery devices not at a user-specified location or at a storage facility, as determined from the delivery device location determination mechanisms) are preferably selected, unavailable delivery devices can additionally or alternatively be selected (e.g., based on predicted behavior).

When the transport of the storage unit is facilitated in response to receipt of an initial request, selecting the delivery device can additionally include determining the number of unassociated storage units that are associated with the delivery device (e.g., on-board the delivery vehicle associated with the delivery device). Unassociated storage units can be storage units having storage identifiers that are unassociated with user identifiers. Delivery devices associated with a number of storage units more than or equal to the requested number of unassociated storage units are preferably sent a delivery request. Alternatively, a score based on the speed, efficiency, and any other suitable delivery parameter can be determined and compared for delivery devices associated with the requisite number of storage units and delivery devices associated with less than the requisite number, wherein visiting a storage facility or storage unit distribution center prior to delivering the storage units is accounted for in the calculation for the latter delivery device category.

Facilitating storage unit transport can additionally include determining the storage facility in which the storage unit is stored and sending the storage identifier of the storage unit to the storage facility for retrieval. Facilitating storage unit delivery can include facilitating storage unit pickup from the storage facility by a delivery person and facilitating storage unit delivery to a user-specified location. Facilitating storage unit pickup from the storage facility by a delivery person can include sending a delivery request (e.g., pickup request), automatically generated by the storage system, to the user device, wherein the delivery request can include the storage facility identifier, a pickup time, and/or a pickup location (e.g., delivery location, retrieval location, pickup location, etc.). The delivery request can additionally include the storage identifier for the transported units, the user identifier of the user receiving the units, special instructions, or any other suitable pickup and delivery information. Facilitating storage unit transport can additionally include selecting a storage facility for storage unit storage. The storage facility can be selected based on proximity to the user-specified location, available capacity, ability to handle the storage unit (e.g., presence of requisite machinery), or based on any other suitable parameter.

2.4. Removing Extra Storage Identifiers.

The method can additionally include removing storage identifiers from the set of storage identifiers associated with the user identifier S400, as shown in FIG. 2, FIG. 3, and FIG. 6. Removing storage identifiers from the set of storage identifiers functions to remove unused storage identifiers from the set associated with the user identifier. Not only does this free up the storage identifier (and therefore, container) for association with a second user, removing the storage identifiers from the set functions to update a user invoice to reflect the number and type of storage units rented by the user. The removed storage identifiers are preferably storage identifiers of unused containers or tags. Storage identifiers associated with unused containers or tags can be determined as storage identifiers associated with an empty fill status or disassociate status, a lack of a storage description, a lack of a record that a storage description entry was prompted for the storage identifier (e.g., the user never scanned or entered the respective storage identifier into the user device), or determined in any other suitable manner. The storage identifier is preferably removed from the set after the storage unit is retrieved from the user location (e.g., after receipt of the storage identifier from the delivery device at the pickup location), but can alternatively be removed prior to storage unit retrieval.

Removing storage identifiers from the set of storage identifiers S400 can include determining a fill status (e.g., association status) of a storage identifier associated with the user identifier and removing storage identifiers having an empty fill status (e.g., disassociate status) from the set of storage identifiers associated with the user identifier. Disassociated storage identifiers have an empty fill status or a disassociated status. The fill status of the storage identifier can be modified to a packed fill status (e.g., associated status) in response to receipt of a packed status, an addition selection, storage description, or any other suitable indicator of storage unit use in association with the storage identifier from a delivery device, user device, or facility device. The fill status of the storage identifier can be modified to an empty fill status (e.g., disassociated status) in response to receipt of an empty status, removal selection, lack of a storage description, or any other suitable indicator of storage unit disuse in association with the storage identifier from a delivery device (e.g., as shown in FIG. 3 and FIG. 6), user device, or facility device. Alternatively, the fill status of the storage identifier can be switched from the empty to packed status in response to receipt of a storage description for the storage identifier, or in response to determination that an entry field was presented to the user. Alternatively, the fill status of the storage identifier can be switched between the empty and packed statuses based on the history of storage identifier receipt. For example, the fill status of the storage identifier can be set as empty if the storage identifier was received from the delivery device at a first timestamp and at a second timestamp beyond a threshold time duration from the first timestamp without receipt of the storage identifier from a user device at an intervening timestamp.

In one example of the method, the set of storage identifiers is associated with the user identifier in response to receipt of the storage identifiers from the delivery device, as shown in FIG. 3 and FIG. 4. In this example, the driver confirms the delivery of empty containers to the user. Alternatively, the user can confirm receipt of the empty containers through an e-signature received at the delivery device. However, delivery of the empty containers can otherwise be confirmed. The storage identifiers preferably have empty fill statuses prior to association with the user identifier. The storage identifiers preferably have empty fill statuses after to association with the user identifier, but can alternatively have packed fill statuses upon assignment. The fill status of the storage identifiers is preferably adjusted upon storage unit pickup, wherein the fill status of a storage identifier can be set as packed in response to receipt of a packed fill status in association with the storage identifier, or set to empty in response to receipt of an empty fill status in association with the storage identifier. The fill status and possibly storage identifier are preferably received from the delivery device, but can alternatively be received from the user device or facility device. The delivery device preferably prompts the driver to select a fill status for each storage identifier that is associated with the user identifier and indicated as delivered (e.g., located at the user location). The storage identifiers having an empty fill status are preferably removed from the set of identifiers associated with the user identifier.

In another example of the method, the set of storage identifiers is associated with the user identifier in response to receipt of the storage identifiers from the delivery device. The method can additionally include determining the received set of storage identifiers received from the user device, and removing the storage identifiers that are within the initially associated set of storage identifiers and not within the received set of storage identifiers.

In another example of the method, the set of storage identifiers is associated with the user identifier in response to receipt of the storage identifiers from the delivery device. The method can additionally include receiving a removal selection associated with a storage identifier from a user device and removing the storage identifier from the set of storage identifiers.

However, the set of storage identifiers can be associated using any combinations of the aforementioned examples, or associated in any other suitable manner.

The method can additionally include receiving a permissions list from a device associated with a primary user identifier. The permissions list can include a list of secondary user identifiers that are permitted access to the storage units of the primary user identifier. Alternatively, the permissions list can include a list of secondary user identifiers associated with storage identifiers, wherein the secondary user identifiers are permitted access to the storage containers associated with the respective secondary user identifiers on the permissions list. This functions to facilitate stored unit, more preferably stored item, sharing between a primary and secondary user. The primary user identifier is preferably the user identifier that sent the initial request. However, the primary user identifier can alternatively be the user identifier associated with the user that initially rented the storage unit from the system. The primary user identifier preferably has control over the access permissions for the storage unit, and can additionally have scheduling control over the storage unit. The secondary user identifiers are preferably user identifiers that are allowed access to, but not ownership of, the storage item. The secondary user identifier is preferably a similar type of user identifier as the primary user identifier (e.g., as described above), but can alternatively be a different type of user identifier. The permissions list can additionally include a permitted time period (e.g., bounded by a first and second timestamp) and/or permitted location (e.g., geographic identifier, coordinates, pre-defined area, label such as home, etc.), wherein secondary user access to the storage unit identified by the storage identifier is limited to the permitted time period and/or location.

The secondary user identifier is preferably permitted access to the storage descriptions of the permitted storage identifiers. In response to receipt of a summary request from the second user identifier, the storage descriptions of the storage identifiers initially associated with the secondary user identifier and the storage descriptions of the permitted storage identifiers can be retrieved and displayed at the secondary user device. The method can additionally include receiving a second storage description for the permitted storage identifier from a device associated with the second user identifier. The second storage description can be stored as the storage description for the permitted storage identifier (e.g., overwrite the storage description received from the primary user identifier), or be stored as a second storage description for the permitted storage identifier.

The method can additionally include receiving processing instructions associated with a storage identifier from a user identifier and facilitating execution of the processing instructions. The processing instructions function to assist in maintenance of the stored items. The processing instructions preferably include processes that are performed on the storage unit or stored item before delivery or after pickup. Examples of processing instructions include dry-cleaning clothes, waxing snowboards or skis, or performing a quality check.

In one variation of the method, facilitating execution of the processing instructions can include facilitating a quality check and receiving confirmation of a quality check. This functions to ensure that a loaned item is in working order prior to storage in the storage facility. The quality check can be a recordation of a test operation, receipt of loaned item images at a set of predetermined view angles, a surface scan of the loaned item, or any other suitable confirmation of a quality check. The quality check can additionally include a confirmation that the loaned item is in working order. The loaned item is preferably returned to the storage facility in response to positive confirmation that the loaned item is in working order. A notification can be sent to the primary user identifier or any other suitable action can be performed in response to a negative confirmation (e.g., the loaned item is not in working order, is damaged, etc.). The quality check can be a part of or function as the confirmation of delivery person receipt of the loaned item, wherein the delivery person performs the quality check. The quality check can be performed by a third party, wherein the system facilitates loaned item delivery and retrieval to and from the third party. The quality check can additionally or alternatively be performed in the storage facility.

The method can additionally include receiving the storage unit from a third party S500, as shown in FIG. 10. This enables the system to function as a distribution center, wherein packed storage units can be received in bulk from a third-party distributor. Storage identifiers can be affixed to individual storage units by the storage facility or by the user. Alternatively, the storage identifiers can be the storage identifiers used or provided by the third-party distributor. Storage descriptions can additionally be associated with the storage identifiers as described above. The user can then request the storage identifiers as described above.

In one example of the method, the method includes receiving an initial request from a user device associated with the user identifier S310. The initial request includes a user identifier, a delivery location, a delivery time, and a request for a storage unit. In response to receipt of the initial request, the system facilitates (e.g., coordinates) delivery of the storage unit to the delivery location at approximately the delivery time S300. The storage unit can have a storage identifier that is associated with an empty fill status. The method additionally includes associating a first and a second storage identifier with the user identifier S100 in response to receipt of a set of storage identifiers (including the first and second storage identifiers) from the delivery device. The method additionally includes receiving a media storage description for the first storage identifier from a user device associated with user identifier S200, wherein the user device can be the same or a different user device as the one that sent the initial request. The method additionally includes facilitating the retrieval of storage units at a pickup time and pickup location S300 in response to receipt of a pickup request including a pickup time and a pickup location S320. The method additionally includes disassociating the second storage identifier from the user identifier S400 in response to receipt of the second storage identifier in association with a disassociate status (e.g., empty fill status) from a delivery device. In response to receipt of summary request received from a user device associated with a user identifier, the system retrieves the storage description associated with the first storage identifier S340. The method can additionally include displaying the storage description for the first storage identifier on the user device alongside a selection box. In response to receipt of a selection box selection and a retrieval time and retrieval location S330, the system can facilitate retrieval of the storage unit identified by the first storage identifier from the storage facility, and can additionally facilitate delivery of the storage units to the retrieval location at the retrieval time S300.

An alternative embodiment preferably implements the above methods in a computer-readable medium storing computer-readable instructions. The instructions are preferably executed by computer-executable components preferably integrated with a physical storage system. The physical storage system can include a storage identification tracking system, a transport scheduling system, and an invoicing system. The computer-readable medium may be stored on any suitable computer readable media such as RAMs, ROMs, flash memory, EEPROMs, optical devices (CD or DVD), hard drives, floppy drives, or any suitable device. The computer-executable component is preferably a processor but the instructions may alternatively or additionally be executed by any suitable dedicated hardware device.

As a person skilled in the art will recognize from the previous detailed description and from the figures and claims, modifications and changes can be made to the preferred embodiments of the invention without departing from the scope of this invention defined in the following claims.

I claim:

1. A method for stored item distribution to a user, the user associated with a user identifier, the method comprising:

by a computing system:
receiving a delivery request associated with the user identifier comprising a requested time, a requested location, and a requested number of containers;
facilitating delivery of a set of containers to the requested location at the requested time, the set of containers comprising at least the requested number of containers, each container of the set associated with a unique storage identifier;
receiving a set of storage identifiers from a delivery device remote from the computing system, each storage identifier of the set of storage identifiers associated with one of the set of containers;
associating the set of storage identifiers comprising a first storage identifier with the user identifier in response to receipt of the set of storage identifiers from the delivery device;
receiving a media description in association with the first storage identifier from a user device associated with the user identifier, the user device remote from the computing system;
storing the media description as a storage description for the first storage identifier;
setting a fill status of the first storage identifier to packed;
receiving a removal request comprising storage identifiers associated with empty fill statuses from a pickup device remote from the computing system;
removing the storage identifiers having an empty fill status from the set of storage identifiers associated with the user identifier;
receiving a summary request associated with the user identifier;
in response to receipt of the summary request, sending the storage description of the first storage identifier;
receiving a retrieval request associated with the user identifier comprising a selection associated with the storage description, a retrieval location, and a retrieval time; and
facilitating delivery of a first container identified by the first storage identifier to the retrieval location at the retrieval time.

2. The method of claim 1, wherein facilitating delivery of the first container to the requested location at the requested time comprises facilitating delivery of a container having an empty fill status to the requested location at the requested time.

3. The method of claim 1, wherein setting the fill status of the first storage identifier to packed comprises: setting the fill status of the first storage identifier to packed in response to receiving a media description in association with the first storage identifier from the user device.

4. The method of claim 1, wherein setting the fill status of the first storage identifier to packed comprises: setting the fill status of the first storage identifier to packed in response to receipt of the first storage identifier in association with a packed fill status from the pickup device.

5. The method of claim 4, wherein removing the storage identifiers having an empty fill status from the set of storage identifiers associated with the user identifier comprises: in response to receipt of the second storage identifier in association with an empty fill status from the pickup device, disassociating the second storage identifier from the user identifier.

6. The method of claim 4, further comprising: in response to receipt of a pickup request comprising a pickup time associated with the user identifier, facilitating container pickup from the requested location at the pickup time by the pickup device.

7. The method of claim 1, wherein facilitating delivery of a first container to the requested location at the requested time comprises sending a delivery request to the delivery device, the delivery request comprising the requested location and requested time.

8. The method of claim 7, further comprising selecting the delivery device from a plurality of delivery devices provided by a third party vehicle service.

9. The method of claim 1, wherein associating the user identifier with the set of storage identifiers comprises associating the user identifier with the set of storage identifiers in response to determination of the user identifier.

10. The method of claim 9, wherein determining the user identifier comprises:
receiving a delivery time and delivery location from the delivery device with the storage identifiers from the delivery device; and
determining the user identifier associated with a delivery request including a requested time within a threshold time duration from the delivery time and a requested location within a threshold location range from the delivery location.

11. The method of claim 1, wherein in response to receipt of the first storage identifier from the delivery device, associating the user identifier with the first storage identifier comprises:
receiving a plurality of images from the delivery device;
extracting a signature pattern from each image; and
identifying a signature pattern from the extracted signature patterns corresponding to the first storage identifier.

12. The method of claim 1, wherein the media description comprises a digital photographic image received from the user device.

13. The method of claim 1, wherein the media description comprises a list of contents of the container.

14. The method of claim 1, wherein associating the user identifier with a set of storage identifiers comprises associating the user identifier with a set of storage identifiers, each storage identifier having an empty fill status.

15. The method of claim 1, wherein setting the fill status of the first storage identifier to packed comprises setting the fill status of the first storage identifier to packed in response to receiving the description for the first container.

16. The method of claim 1, wherein setting the fill status of the first storage identifier to packed comprises setting the fill status of the first storage identifier to packed in response to receipt of the first storage identifier in association with a packed fill status from the pickup device.

17. The method of claim 16, wherein removing storage identifiers having an empty fill status from the set of storage identifiers associated with the user identifier comprises removing a second storage identifier having an empty fill status from the set of storage identifiers associated with the user identifier, wherein receipt of the removal request from a device remote from the computing system comprises receipt of the second storage identifier in association with an empty fill status from the pickup device.

18. The method of claim 1, wherein receiving a description for the first storage identifier comprises receiving media indicative of container contents associated with the first storage identifier from the user device.

19. The method of claim 18, wherein the media comprises a digital photograph image of the container contents.

20. The method of claim 1, wherein associating the set of storage identifiers with the user identifier further comprises associating a second storage identifier with the user identifier; the method further comprising:
- receiving a removal request comprising the second storage identifier from the delivery device; and
- removing the second storage identifier from the set of storage identifiers associated with the user identifier.

21. The method of claim 1, wherein:
- facilitating delivery of a set of containers to the requested location comprises facilitating delivery of a set of containers comprising more than the requested number of containers to the requested location; and
- receiving the set of storage identifiers from the delivery device comprises receiving a set of storage identifiers comprising more storage identifiers than the requested number of containers.

* * * * *